United States Patent Office 3,179,681
Patented Apr. 20, 1965

3,179,681
THIOCYANOPHENYL DERIVATIVES
Kurt Gubler and Enrico Knüsli, Riehen, near Basel, Switzerland, assignors to J. R. Geigy A.-G., Basel, Switzerland
No Drawing. Filed May 9, 1962, Ser. No. 193,598
Claims priority, application Switzerland, May 10, 1961, 5,508/61
9 Claims. (Cl. 260—454)

The present invention is concerned with new pest control agents which are excellent active ingredients for the combatting of fungi, especially phytopathogenic fungi and, in addition, can also have insecticidal, nematocidal, acaricidal and bactericidal activity.

Examples of plant diseases which can be effectively controlled or combatted with the new active substances are: downy mildew (*Plasmopara viticola*) for example on grapes, powdery mildew (Erysiphe) for example on wheat and cucumbers, grey mould (*Botrytis cinerea*) for example on *Vica faba* plants etc.

It has surprisingly been found that new thiocyanophenyl derivatives of the formula

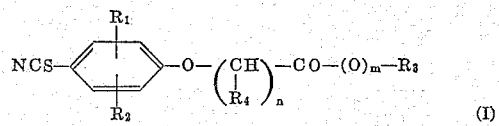

(I)

wherein each of $R_1$ and $R_2$ independently is hydrogen or halogen e.g. chlorine, bromine, especially chlorine, lower alkyl (1 to 4 carbons) e.g. methyl, isopropyl etc. alkenyl containing 2 to 3 carbons, e.g. allyl, alkoxy containing 1 to 4 carbons e.g. methoxy etc. or nitro, $R_3$ is alkyl containing 1 to 8 carbons e.g. methyl, ethyl, isopropyl, butyl, amyl, octyl etc., alkenyl containing 2 to 4 carbons e.g. allyl, crotyl, butenyl, halogenated alkyl containing 1 to 4 carbons e.g. chloroethyl etc., halogenated alkenyl containing 2 to 3 carbons e.g. dichloroallyl etc. and alkinyl containing 3 carbons e.g. propargyl, $R_4$ is hydrogen or methyl, preferably hydrogen, $n$ and $m$ independently are zero or one (if $n$ is one $m$ should preferably also be one), are excellently active ingredients for the combatting of fungi, in particular phytopathogenic fungi and, in addition, can also have insecticidal, nematocidal, acaricidal and bactericidal activity.

The new active ingredients of Formula I can be appropriately divided into four subgeneric formulae:

(*a*) Aromatic-aliphatic diesters of carbonic acid having the formula

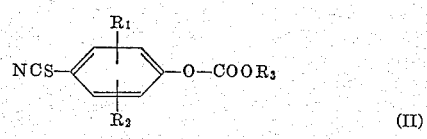

(II)

wherein $R_1$, $R_2$ and $R_3$ have the meanings given above ($n$ is zero and $m$ is one, in relation to Formula I).

These compounds of Formula II are good fungicides and are also especially valuable for their insecticidal activity, e.g. against mosquitos, gnats of the genus Aedes.

(*b*) Thiocyanophenol esters of aliphatic, saturated or unsaturated monocarboxylic acids having the formula

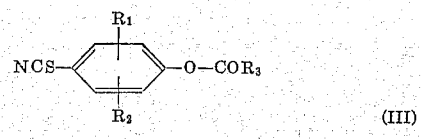

(III)

wherein $R_1$, $R_2$ and $R_3$ have the meanings given above (and $n$ and $m$ are both zero, in relation to Formula I).

These compounds of Formula III are good fungicides, (*c*) Esters of aliphatic thiocyanophenoxy monocarboxylic acids having the formula

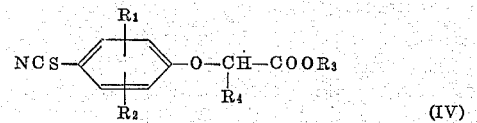

(IV)

wherein $n$ and $m$ are each one (in relation to Formula I) and $R_1$, $R_2$, $R_3$ and $R_4$ have the meanings given above.

These compounds of Formula IV besides having a fungicidal activity have a very pronounced acaricidal activity, e.g. against the common red spider (*Tetranychus urticae*), and (*d*) Aliphatic thiocyanophenoxy ketones having the formula

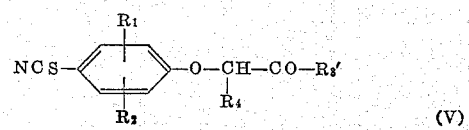

(V)

wherein $R_1$, $R_2$ and $R_4$ have the meanings given above, $R_3'$ is alkyl having 1 to 4 carbons, ($n$ is one and $m$ is zero, in relation to Formula I).

Compounds of Formula V are good fungicides.

The new active ingredients of Formula I and the more specific Formulae II to V can be produced by the methods known from the literature. If desired substituted 4-thiocyanophenols produced by known methods, are used as starting materials. These can be converted with phosgene, for example in solution in the presence of an inorganic or organic base, into the corresponding chloroformic acid esters and then reacted with, if desired, chlorinated lower alkanols, alkenols or alkinols to form diesters of Formula II. Benzene, ethyl acetate or ether etc. can serve as solvents for this reaction.

Active ingredients of Formula III are obtained, for example, if the starting phenols are heated with lower molecular aliphatic monocarboxylic acid chlorides or bromides in the presence of basic substances, either direct or in organic solvents. Active substances of the Formula IV are obtained, for example, by reacting the starting phenols with halogen acetic acid- or α-halogen-propionic acid-alkyl alkenyl or alkinyl esters. This reaction can be performed in organic solvents such as benzene or acetone, in the presence of potash or of tertiary amines. Finally, active ingredients of formula V are obtained if, in the reaction described immediately above, the corresponding halogen ketones are employed instead of the halogen acetic or α-halogen propionic acid esters. If a chlorocarbonic acid ester is used in this method, then active ingredients of the formula II are obtained. Examples of solvents or diluents for the reactions described above are water or, in particular, organic solvents such as benzene, toluene, ether, ethyl acetate etc.

The new active ingredients are colourless, neutral substances which are either crystalline or liquids which can be distilled under high vacuum.

The following examples illustrate various methods for the production of the new esters. Parts are given therein as parts by weight and the temperatures are in degrees centigrade.

*Example 1*

A mixture of 13 parts of 3-methyl-4-thiocyanophenol, 12.6 parts of calcined potassium carbonate, 1.9 parts of potassium iodide, 9.5 parts of crotonic acid chloride and 200 parts by volume of acetone are refluxed for 12 hours. The product is worked up by filtering off the precipitate, evaporating off the acetone and dissolving the residue in ether. The ethereal solution is treated three times with 50 parts by volume of ice cold 2 N sodium hydroxide solution and then washed neutral with water. The solution, dried with sodium sulphate, is concentrated and the residue is purified by distillation. The pure product, crotonic acid-(3-methyl-4-thiocyano)-phenyl ester, distills under high vacuum at 116.7–120° C. under a pressure of 0.0001 mm. Hg.

*Example 2*

16.5 parts of 2-methyl-4-thiocyanophenol, 16 parts of calcined potassium carbonate, 13 parts of chlorocarbonic acid ethyl ester and 200 parts by volume of benzene are refluxed together for 12 hours. The product is worked up by diluting with benzene, shaking three times with 50 parts by volume of ice cold 2 N sodium hydroxide solution each time, washing three times with 100 parts by volume of water each time and evaporating off the benzene. After recrystallising twice, the O-(2-methyl-4-thiocyanophenyl)-O'-ethyl carbonate melts at 44.5–47°.

Other active ingredients of the general Formula I are given below which can be produced by one of the methods described above.

O-(3-methyl-4-thiocyanophenyl)-O'-ethyl carbonate, $B.P._{0.01}=123–125°$,
O-(4-thiocyanophenyl)-O'-ethyl carbonate, $B.P._{0.02}=136–138°$,
O-(3-methyl-4-thiocyanophenyl)-O'-methyl carbonate, $B.P._{0.0075}=122–124°$,
O-(3-methyl-4-thiocyanophenyl)-O'-isopropyl carbonate, M.P. 53–56°,
O-(3-methyl-6-isopropyl-4-thiocyanophenyl)-O'-ethyl carbonate, $B.P._{0.001}=124–126°$,
O-(3-methyl-4-thiocyanophenyl)-O'-n-butyl carbonate, $B.P._{0.009}=145–149°$,
O-(3-methyl-6-isopropyl-4-thiocyanophenyl)-O'-allyl carbonate
O-(3-methyl-6-isopropyl-4-thiocyanophenyl)-O'-methyl carbonate, $B.P._{0.004}=126–131°$,
O-(3-methyl-6-isopropyl-4-thiocyanophenyl)-O'-n-butyl carbonate, $B.P._{0.009}=155–156°$,
O-(3-methyl-4-thiocyanophenyl)-O'-n-amyl carbonate, $B.P._{0.015}=156–158°$,
O-(2-methyl-4-thiocyanophenyl)-O'-isopropyl carbonate, $B.P._{0.009}=128–131.5°$,
O-(2-methyl-4-thiocyanophenyl)-O'-n-butyl carbonate, $B.P._{0.008}=156°$,
O-(2,6-dichloro-4-thiocyanophenyl)-O'-ethyl carbonate, M.P. 69–71°,
O-(2-nitro-4-thiocyanophenyl)-O'-ethyl carbonate, M.P. 53–56.5°,
Crotonic acid-(2-methyl-4-thiocyano)-phenyl ester, $B.P._{0.0001}=122.5–125.5°$,
Crotonic acid-(4-thiocyano)-phenyl ester, M.P. 46.5–50°,
Acetic acid-(3-methyl-4-thiocyano)-phenyl ester, M.P. 48–50°,
(3-methyl-4-thiocyanophenoxy)-acetic-acid ethyl ester, M.P. 52–53°,
(3-methyl-6-isopropyl-4-thiocyanophenoxy)-acetic acid ethyl ester, M.P. 61–64.5°,
(3-methyl-6-isopropyl-4-thiocyanophenoxy)-acetic acid methyl ester, M.P. 57.5–59°,
(3-methyl-6-isopropyl-4-thiocyanophenoxy)-acetic acid β-chloroethyl ester, $B.P._{0.015}=186–189°$,
(3-methyl-6-isopropyl-4-thiocyanophenoxy)-acetic acid-isopropyl-ester, $B.P._{0.02}=165–170°$,
(3-methyl-6-isopropyl-4-thiocyanophenoxy)-acetic acid-ω-propylester, $B.P._{0.007}=144.5–148°$,
(3-methyl-6-isopropyl-4-thiocyanophenoxy)-acetic acid-(2,3-dichloro)-allyl ester, $B.P._{0.01}=203°$,
(3-methyl-6-isopropyl-4-thiocyanophenoxy)-acetic acid-buten-(2)-yl ester,
(3-methyl-6-isopropyl-4-thiocyanophenoxy)-acetic acid-propargyl ester, $B.P._{0.02}=178–183.5°$,
(3-methyl-6-isopropyl-4-thiocyanophenoxy)-acetic acid-n-octyl ester, $B.P._{0.03}=212–217°$,
(3-methyl-6-isopropyl-4-thiocyanophenoxy)-acetic acid-n-butyl ester, $B.P._{0.03}=191–195°$,
α-(3-methyl-6-isopropyl-4-thiocyanophenoxy)-propionic acid ethyl ester,
(3-methyl-6-isopropyl-4-thiocyanophenoxy)-acetic acid-allyl ester, $B.P._{0.01}=170–172°$,
(2-methyl-4-thiocyanophenoxy)-acetic acid-isopropyl ester, $B.P._{0.008}=138–140°$,
(2-methyl-4-thiocyanophenoxy)-acetic acid-allyl ester, $B.P._{0.006}=143–144°$,
(2-methyl-4-thiocyanophenoxy)-acetic acid-β-chloroethyl ester, $B.P._{0.02}=192–193°$,
(3-methyl-4-thiocyanophenoxy)-acetic acid methyl ester, M.P.=68°,
4-thiocyanophenoxy-acetic acid-ethyl ester, $B.P._{0.05}=164–165.5°$,
(2-nitro-4-thiocyanophenoxy)-acetic acid-ethyl ester, M.P. 65.5°,
(2-methyl-4-thiocyanophenoxy)-acetic acid-n-octyl ester, $B.P._{0.003}=183–184°$,
(2-isopropyl-4-thiocyanophenoxy)-acetic acid-ethyl ester, $B.P._{0.04}=168–170°$,
(2-allyl-6-methyl-4-thiocyanophenoxy)-acetic acid-ethyl ester,
(3-methoxy-4-thiocyanophenoxy)-acetic acid-ethyl ester,
1-(2-methyl-4-thiocyanophenoxy)-acetone, M.P.=74–77°

The phytotoxicity of the new active ingredients is slight.

The new active substances can be used as such or in combination with suitable carriers, or adjuvants i.e. usual pulverulent, semi-solid (salve-like), liquid, gaseous carriers, diluents and/or distributing agents. The adjuvants should be non-basic i.e. neutral or acidic. They are suitable in the first place for the protection of plants and parts thereof from attack by injurious fungi, but they can also be used for the treatment of organic materials such as, e.g. wood, furs and leather. Some of the new active ingredients can also be used as insecticides (Formula II) or as acaricides (Formula IV).

The new active ingredients can be applied in solid form, for example, as finely pulverised dusts or sprinkling agents, sometimes also as granulates, and also in liquid form as emulsion, suspension, spray suspension or solution.

For example the new active substances can be combined with solid pulverulent, preferably non-basic carriers such as, for example, talcum, kaolin, bole, bentonite, chalk, ground limestone, and if desired, the pulverulent fungicides obtained can be made suspendable in water by the addition of wetting and dispersing agents. The active substances can also be dispersed in water with the aid of suitable emulsifying agents or they can be dissolved in organic solvents, for example, in chlorinated hydrocarbons such as trichloroethylene or in medium petroleum fractions, this possibly with the addition of auxiliary solvents such as acetone, higher ketones or dimethyl formamide. After the addition of suitable emulsifying agents, e.g. of aromatic polyglycol ethers, mixtures with auxiliary solvents can be worked up with water into emulsions. The active substances, however, can also be distributed in the air in the form of aerosols, smoke or steam, particularly for example, in storerooms and greenhouses.

Dusts suitable for application of the active substances according to the invention can be produced, for example, by mixing or milling together the active substances with a solid carrier. As such can be used: talcum, diatomaceous earth, kaolin, bentonite, calcium carbonate, boric acid or tricalcium phosphate. On the other hand, the substances can also be brought onto the carriers by means of a volatile solvent.

To produce emulsions, the active substances as such or after dissolving them in organic solvents such as, e.g. xylene, can be emulsified in water which contains a capillary active substance. For practical application however, it is generally more advantageous first to combine liquid active substances with capillary active substances or to combine solid or liquid active substances with inert organic solvents and capillary active substances to produce concentrates which, in their turn, are single phase systems, i.e. solutions or multi-phase systems; these can then be worked up with water into ready-for-use emulsions. As capillary active substances, non-ionogenic substances such as, e.g. polyethylene glycol ethers of fatty alcohols or of dialkyl phenols and polycondensation products of ethylene oxide can be used. Cyclic hydrocarbons such as benzene, toluene or, particularly, xylene, and also ketones such as acetone, butanone, cyclohexanone or methylcyclohexanones are suitable, for example, as solvents for the production of emulsion concentrates.

Suspensions can be obtained by suspending wettable powders in water, which powders are produced in their turn by combining solid active substances with capillary active substances or combining solid or liquid active substances with solid pulverulent carriers and capillary active substances.

In addition, the active substances produced according to the invention can also be dissolved in organic solvents, for example in chlorinated hydrocarbons such as trichloroethylene or in medium petroleum fractions, possibly with the addition of auxiliary solvents such as acetone or higher ketones. Finally, the active substances can be dispersed in the air also, in the form of aerosol, smoke or mist, this particularly in storerooms or green houses.

To increase the duration of action, it is sometimes advantageous to add suitable stabilizers either before or after the active substances are combined with the carriers. Epoxides may be employed as, e.g. epichlorohydrin, cyclohexenoxide, styrene oxide, glycide ethers such as 1-phenoxy-2,3-epoxypropane, or 1,β-naphthoxy-2,3-epoxypropane. Other stabilizers, however, may be employed to increase the stability of the active substances according to the invention.

If desired, the biological activity of the agents according to the invention can be supplemented by the addition of insecticidally, nematocidally or other fungicidally active substances. A combination with other plant protection agents or with any additives desired which influence the funcigidal action in any particular direction is also possible.

Some typical forms of application are given in the following examples. Parts are given therein as parts by weight:

*Example 3*

2–5 parts of active substance, e.g. O-(2-methyl-4-thiocyanophenyl)-O'-ethyl carbonate are ground with 98–95 parts of talcum. The dust so obtained is an active disinfectant, for example, for seed bed earth and also for plants or parts thereof such as bulb and tumours.

*Example 4*

On milling together 10 parts of active substance, e.g. acetic acid-(3-methyl-4-thiocyano)-phenyl ester, 82 parts of kaolin or chalk and mixing with 8 parts of wetting and dispersing agents, e.g. 8 parts of sulphite waste liquor, a concentrate is obtained which, on mixing with water, produces a fungicidal and acaricidal spray which is excellently suitable for the treatment of the parts of plants above the ground.

*Example 5*

20 parts of crotonic acid-(4-thiocyano)-phenyl ester, 50 parts of xylene and 30 parts of ethylene oxide condensation products of alkyl phenols are mixed together to obtain a concentrate which can be used for the preparation of emulsions. The emulsions so obtained can be used for combatting fungi diseases on plants.

What is claimed is:
1. A compound of the formula

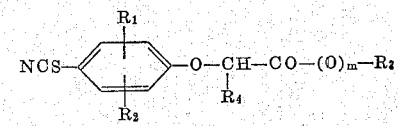

wherein
R₁ and R₂ are independently selected from the group consisting of hydrogen, chlorine, bromine, lower alkyl, alkenyl containing 2–3 carbon atoms, alkoxy containing 1–4 carbon atoms and nitro,
R₃ is a member selected from the group consisting of alkyl containing 1 to 8 carbon atoms, alkenyl containing 2–4 carbon atoms, chloro alkyl containing 1 to 4 carbon atoms, chloro alkenyl containing 2–3 carbon atoms and propargyl,
R₄ is a member selected from the group consisting of hydrogen and methyl, and
m is independently a number from zero to one inclusive.

2. O-(2-methyl-4-thiocyanophenyl)-O' - isopropyl carbonate.
3. (3-methyl-6-isopropyl-4 - thiocyanophenoxy) - acetic acid methyl ester.
4. (3-methyl-6-isopropyl-4 - thiocyanophenoxy) - acetic acid β-chloro ethyl ester.
5. (3-methyl-6-isopropyl-4 - thiocyanophenoxy) - acetic acid isopropyl ester.
6. (3-methyl-6-isopropyl-4 - thiocyanophenoxy) - acetic acid propargyl ester.
7. (3-methyl-6-isopropyl-4 - thiocyanophenoxy) - acetic acid n-butyl ester.
8. (3-methyl-6-isopropyl-4 - thiocyanophenoxy) - acetic acid allyl ester.
9. (3-methyl-6-isopropyl-4 - thiocyanophenoxy) - acetic acid n-propyl ester.

References Cited by the Examiner
UNITED STATES PATENTS

| | | | |
|---|---|---|---|
| 2,214,971 | 9/40 | Muller | 260—454 |
| 2,435,274 | 2/48 | Hester | 167—30 |
| 2,859,235 | 11/58 | Schmidt et al. | 260—454 |
| 2,866,804 | 12/58 | Nischk et al. | 260—454 |
| 2,965,535 | 12/60 | Birum | 167—30 |

FOREIGN PATENTS 707,589  4/54  Great Britain.

CHARLES B. PARKER, *Primary Examiner.*